US008984951B2

(12) United States Patent
Landmann et al.

(10) Patent No.: US 8,984,951 B2
(45) Date of Patent: Mar. 24, 2015

(54) SELF-HEATED PRESSURE SENSOR ASSEMBLIES

(71) Applicant: Kulite Semiconductor Products, Inc., Leonia, NJ (US)

(72) Inventors: Wolf Landmann, Fair Lawn, NJ (US); Joseph R. VanDeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 266 days.

(21) Appl. No.: 13/622,241

(22) Filed: Sep. 18, 2012

(65) Prior Publication Data

US 2014/0076056 A1    Mar. 20, 2014

(51) Int. Cl.
*G01L 19/06*    (2006.01)
*G01L 19/04*    (2006.01)

(52) U.S. Cl.
CPC ..................................... *G01L 19/04* (2013.01)
USPC ............................................. 73/721; 73/727

(58) Field of Classification Search
None
See application file for complete search history.

(56) References Cited

U.S. PATENT DOCUMENTS

| 7,258,015 | B1* | 8/2007 | Shaw et al. | 73/708 |
| 7,415,884 | B1* | 8/2008 | Shaw et al. | 73/708 |
| 8,006,564 | B1* | 8/2011 | Shaw et al. | 73/708 |
| 8,127,616 | B1* | 3/2012 | Carver et al. | 73/715 |
| 8,544,335 | B1* | 10/2013 | Shaw et al. | 73/708 |
| 8,596,131 | B1* | 12/2013 | Carver et al. | 73/715 |
| 2007/0234816 | A1* | 10/2007 | Lantz | 73/754 |
| 2010/0192694 | A1* | 8/2010 | Hammerschmidt | 73/708 |
| 2011/0132096 | A1* | 6/2011 | Ricks | 73/708 |

* cited by examiner

*Primary Examiner* — Andre Allen
(74) *Attorney, Agent, or Firm* — Troutman Sanders LLP; James E. Schutz; Mark Lehi Jones

(57) ABSTRACT

The present invention provides a self-heated pressure sensor assembly and method of utilizing the same. The self-heated pressure sensor assembly regulates and maintains the temperature of the pressure sensor, regardless of the external temperature environment, without an external heater as in prior art embodiments. Exemplary embodiments of the pressure sensor assembly incorporate a resistance heater that is built into the sensing chip of the pressure sensor assembly. The pressure sensor assembly also utilizes the resistance of the pressure sensing elements to monitor the temperature of the assembly, which works alongside the resistance heater to maintain a stable temperature within the pressure sensor assembly.

18 Claims, 2 Drawing Sheets

SELF-HEATED PRESSURE SENSOR ASSEMBLIES

TECHNICAL FIELD

The present invention relates to pressure sensor assemblies, and more particularly to pressure sensor assemblies comprising built-in resistance heaters to aid in monitoring and maintaining a stable pressure sensor temperature.

BACKGROUND

Piezoresistive pressure sensors operate in a wide range of temperature conditions, for example, from extremely low cryogenic temperatures to extremely hot temperatures often associated with gas turbine engines. While such sensors may operate over broad temperature ranges, the accuracy of the sensor is often disrupted as prior art sensors are much more accurate when operating within narrower temperature ranges. There are many ways to correct for these inaccuracies, however. One way is described in U.S. Pat. No. 5,549,006, which is assigned to Kulite Semiconductor Products, the assignee herein.

If the sensor is maintained at a stable temperature, however, such methods described in U.S. Pat. No. 5,549,006 are not necessary to achieve high accuracy. There are a few ways to maintain a stable temperature. For example, prior art embodiments regulate and maintain the temperature of a pressure sensor by incorporating an external heater and an accompanying temperature sensor. The temperature sensor detects a change in temperature within the pressure sensor and cooperatively works with an external heater to maintain a steady pressure sensor temperature. Such external heaters may be costly and may undesirably add to the overall size of the sensing device, therefore it is desirable to regulate and maintain the temperature of a pressure sensor without the added cost and size of an external heater. It is to this need that the present invention is directed.

BRIEF SUMMARY OF INVENTION

Various embodiments of the present invention provide a method of maintaining temperature within a pressure sensor assembly, comprising activating a first plurality of resistive elements associated with a piezoresistive bridge enabling the piezoresistive bridge to measure an applied pressure; monitoring a voltage across a first resistive element of the first plurality of resistive elements associated with the piezoresistive bridge, wherein the voltage is indicative of a temperature within the piezoresistive bridge; and activating a built-in heating element when the voltage across the first resistive element falls below or rises above a threshold value.

Other embodiments of the present invention provide a pressure sensor assembly, comprising a first resistive bridge comprising a plurality of resistive elements adapted to measure an applied pressure and release a voltage indicative of temperature within the first resistive bridge; an electronic device configured to receive the voltage indicative of temperature; and a heating element integrated with the first resistive bridge and in electrical communication with the electronic device, wherein the heating element is activated by the electronic device when the voltage falls below or rises above a threshold value.

DETAILED DESCRIPTION OF PREFERRED EMBODIMENTS

Figure 1:
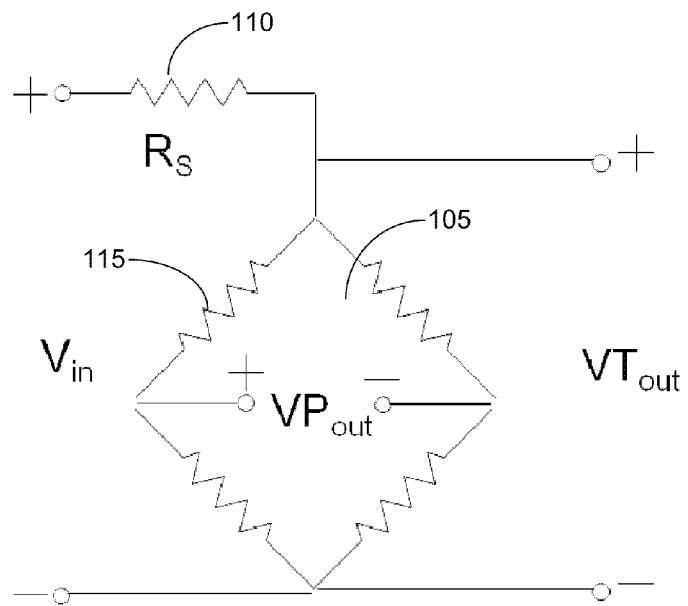
FIG. 1 illustrates an exemplary embodiment of a piezoresistive bridge of a pressure sensor assembly coupled to a span resistor in series with the bridge in accordance with the present invention.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an," and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring now to the drawings, in which like numerals represent like elements, exemplary embodiments of the present invention are herein described. It is to be understood that the figures and descriptions of the present invention have been simplified to illustrate elements that are relevant for a clear understanding of the present invention, while eliminating, for purposes of clarity, many other elements found in typical pressure sensor assemblies and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

The present invention provides a self-heated pressure sensor assembly and method of utilizing the same. The self-heated pressure sensor assembly regulates and maintains the temperature of the pressure sensor, regardless of the external temperature environment, without an external heater (as is commonly used in prior art embodiments). Consequently, the present invention increases the accuracy and stability of a pressure sensor assembly.

Exemplary embodiments of the pressure sensor assembly utilize existing elements (already equipped to measure an applied pressure) to indirectly monitor temperature of the sensor, for example, resistors in the sensor circuit may be used. One skilled in the art will appreciate that resistors inherently change resistance with respect to temperature, thus along with measuring an applied pressure, the resistance value of existing resistor elements may be indicative of the temperature of the sensor. Such resistance values may be communicated to a comparator, for example but not limited to an analog comparator, which may then determine, based on the resistance values, whether the sensor needs to be heated or whether heating of the sensor should cease. Further, the comparator is in electrical communication with a built-in heating element and thus activates the heating element when the sensor needs heating and deactivates the heating element when heating is no longer necessary. This enables constant regulation and maintenance of the temperature within the pressure sensor. The heating element may come in various forms, for example, existing resistors may coincidingly serve as the heating element, or the heating element may be a separate set of resistors integrated with existing resistors, or alternatively, the heating element may be a separate set of resistors disposed above or below existing resistors. Each embodiment will be discussed in detail below. Alternately, a more complex digital circuit such as a microprocessor may be used to control the temperature of the sensor using the described heating elements. This may be useful in the case where a microprocessor is already being used for signal processing of the pressure signal.

Referring to FIG. 1, exemplary embodiments of the pressure sensor assemblies of the present invention may comprise a piezoresistive Wheatstone bridge 105 configured to sense an applied pressure. One skilled in the art will appreciate that Wheatstone bridges 105 generally comprise four resistors configured to respond to an applied pressure. These resistors or other resistors used in or around the Wheatstone bridge 105 may be referred to as the "existing resistors." Further, one skilled in the art will appreciate that resistors inherently change voltage value with respect to temperature, thus existing resistors within the Wheatstone bridge 105 can double as pressure sensors and temperature indicators. Exemplary embodiments further comprise a span resistor ($R_S$) 110 coupled in series to the bridge 105. The span resistor 110 may be configured to monitor voltage at a node connecting the span resistor 110 to the bridge 105.

This voltage is indicative of the voltage of the existing resistors within the bridge 105 and thus is also indicative of temperature within the bridge 105, as previously described. The span resistor 110 may then electrically communicate the voltage information to a comparator, which determines whether the voltage level has fallen below or risen above a threshold. The comparator may then activate or deactivate the heating element, respectively, to maintain a stable temperature within the pressure sensor assembly. As previously mentioned, the heating element of the present invention may be configured in several ways. As a first example, illustrated in FIG. 1, existing piezoresistive elements found in traditional Wheatstone bridges may coincidingly serve as the heating element. As a second example, illustrated in FIG. 2, a separate set of resistors may be integrated with existing piezoresistive elements found in traditional Wheatstone bridges, wherein the separate set of resistors serve as the heating element. As a third example, illustrated in FIG. 3, a resistance heating element comprising additional resistors may be diffused into a silicon wafer such that it is positioned beneath standard piezoresistive elements found in traditional Wheatstone bridges, wherein the additional resistors serve as the heating element.

In a first exemplary embodiment, existing piezoresistive elements within the Wheatstone bridge 105 may be coincidingly used as both the pressure measurement element and the heating element. Because piezoresistors are resistive elements, they inherently act as heaters when large enough currents are passed through them. Thus, this embodiment can be incorporated into conventional pressure transducers, as well as diffused-type sensors and silicon on insulator (SOI) sensors without modification because the same, standard electrical connections may be used for both heating and pressure measurements.

In this embodiment, if the comparator determines that the sensor should be heated, it may send a signal that applies a relatively large DC voltage to the piezoresistors to enable heating. Simultaneously, a smaller AC voltage can be continuously applied to the piezoresistors to enable pressure measurements. The coupling of the AC voltage removes the DC voltage used for heating purposes from the pressure measurement to ensure the heating mechanism does not interfere with the pressure measurement. In a similar manner, the temperature measurement can be made by AC coupling the measurement of the voltage on the span resistor to remove any DC bias. One skilled in the art will appreciate that this electrical configuration may also be reversed, i.e., the AC voltage may be used for heating purposes and the DC voltage may be used for pressure measurement purposes.

Alternatively, alternating DC and AC voltages may be applied to piezoresistive elements to alternate heating and the ability to take pressure measurements, respectively. For example, if only intermittent heating is needed (e.g., when operating in a relative stable external environment), the bridge 105 may be temporarily heated via a DC voltage and subsequently switched off to accommodate the application of an AC voltage to enable pressure measurements before the bridge 105 cools down. After the pressure measurement is complete, heating of the bridge 105 may subsequently resume as needed to maintain the overall temperature of the bridge 105. Thus, the DC and AC voltages can be alternatingly applied to alternatingly heat and take pressure measurements. Again, one skilled in the art will appreciate that this electrical configuration may be reversed and the AC voltage may be used for heating purposes and the DC voltage may be used for pressure measurement purposes.

In yet another example, the same DC voltage may be used for both heating purposes and pressure measurement purposes. One skilled in the art will appreciate that because the output voltage of the bridge is ratiometric with the input voltage, it is possible to ratio all of the outputs to the input voltage, which enables the same DC voltage to be used for heating and measurement purposes.

Figure 2:
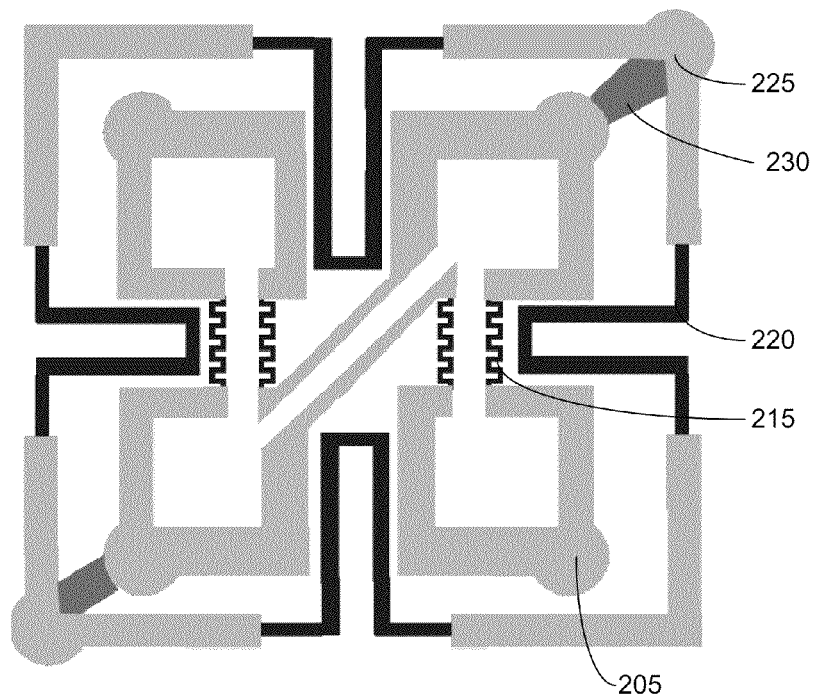
FIG. 2 illustrates an exemplary embodiment of yet another piezoresistive bridge of a pressure sensor assembly comprising resistance heater elements in accordance with the present invention.

In some instances, it may not be possible to use existing piezoresistive elements for both heating and pressure measurement purposes. Thus, in a second exemplary embodiment, additional resistors 220 (distinguishable from existing piezoresistors 215 traditionally found in Wheatstone bridges) may be integrated with existing piezoresistors 215, as illustrated in FIG. 2, wherein the additional resistors 220 serve as the heating element and the existing piezoresistors 215 maintain its primary function of pressure measurement (and temperature monitoring).

The additional resistors 220 may be of a lower resistance than the standard piezoresistors 215 of the bridge 205.

Because the additional resistors 220 may be of a lower resistance, a lower voltage may be used to heat the additional resistors 220, therefore making the voltage levels more compatible with standard sensor operation. Further, the additional resistors 220 may be strategically placed around the standard piezoresistors 215 to provide even heat distribution over the bridge 205. In embodiments where DC voltages are to be used for both heating and pressure measurement purposes, it is preferable, but not necessary, to incorporate at least one bonding pad 225 adapted to supply a separate DC voltage to the additional resistors 220. This bonding may be linked to the bridge resistor via a linkage 230 or it may be a completely isolated circuit. Alternatively, the same DC voltage can be used for both the additional resistors 220 and the standard piezoresistors 215, and the ratio of the outputs can be compared to the DC input, as previously described. In other embodiments, the bonding pads 225 may utilize both AC and DC voltages, as also previously described.

Figure 3:
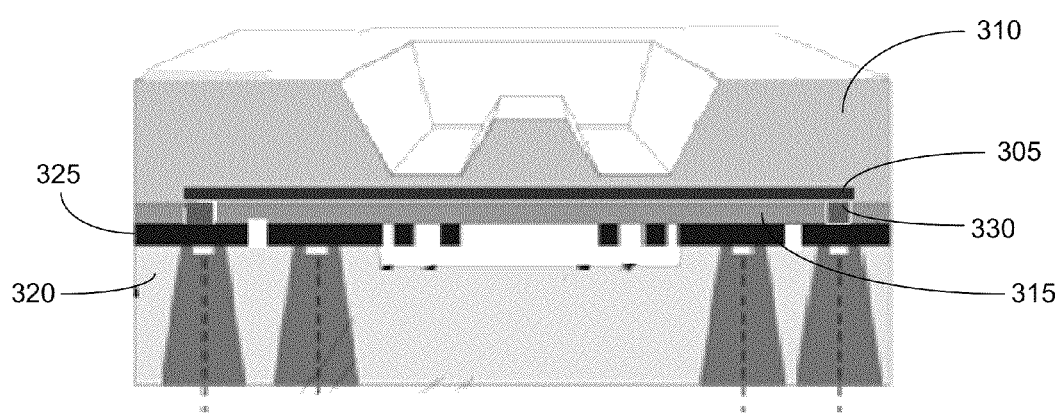
FIG. 3 illustrates a cross-sectional view of an exemplary embodiment of a pressure sensor assembly comprising diffused resistance heater elements in accordance with the present invention.

The third exemplary built-in resistance heater embodiment may be used for SOI sensors, specifically, however the embodiment may be used for other pressure sensor assembly configurations as well. As one skilled in the art will appreciate, the piezoresistive gauges in SOI sensors may be electrically and thermally isolated from a silicon semiconductor by a thin oxide layer. Depending on the heating accuracy needed for a typical application, this may not pose a problem. However, for certain high precision applications, the extra thermal resistance may create uneven temperature gradients, which may lead to small inaccuracies. To address the challenges associated with some SOI sensors, and further referring to FIG. 3, a resistance heating element 305 may be diffused into a silicon wafer 310 such that it is positioned beneath an oxidized surface 315 of a silicon wafer 310. A second silicon wafer 325 is then bonded to the oxidized surface such that the pressure sensing piezoresistors are directly above the heating elements. The entire sensing element can then be bonded onto a glass insulator 320 to isolate the chip both mechanically and thermally from the packaging. This insulator 320 can either be mounted to the front side of the chip as illustrated in FIG. 3 in leadless packing designs or to the back side in a traditional ball bonded configuration. As previously described, bonding pads 330 may be incorporated to supply a separate DC voltage to the heating element 305. The bonding pads 330 may be connected to the main bonding pads of the resistance pattern 325 by metal traces or can remain separate and isolated from the main bonding pads.

In this third exemplary built-in heater embodiment, because the heating element 305 is embedded into the silicon 310, which is an excellent thermal conductor, the heat applied to the piezoresistors of the resistance pattern 325 is evenly distributed. Further, the heating element 305 is positioned over the piezoresistors of the resistance pattern 325, and thus on a separate layer, which prevents wire traces from the heating element 305 and the piezoresistors of the resistance pattern 325 from crossing. Also, because the heating element 305 is the only element diffused into the silicon 310, there is no worry about leakage currents at high temperatures. Again, heating may be carried out in several different ways. For example, the heating voltage and pressure measurement voltages may be alternatively activated or the heating voltage may be activated as needed to maintain a steady sensor temperature, as previously described. It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

What is claimed is:

1. A method of maintaining temperature within a pressure sensor assembly, comprising:
   activating a first plurality of piezoresistive elements associated with a piezoresistive bridge enabling the piezoresistive bridge to measure an applied pressure;
   monitoring a voltage across a first piezoresistive element of the first plurality of piezoresistive elements associated with the piezoresistive bridge, wherein the voltage is indicative of a temperature within the piezoresistive bridge; and
   activating a built-in heating element when the voltage across the first piezoresistive element falls below or rises above a threshold value, wherein the built-in heating element comprises one or more of the first plurality of piezoresistive elements.

2. The method of claim 1, wherein the built-in heating element comprises the first plurality of piezoresistive elements.

3. The method of claim 1, wherein the built-in heating element comprises one or more of a second plurality of resistive elements.

4. The method of claim 3, wherein the second plurality of resistive elements are of a lower resistance than the first plurality of piezoresistive elements.

5. The method of claim 1, wherein the first plurality of piezoresistive elements are activated by an AC voltage.

6. The method of claim 1, wherein the first plurality of piezo resistive elements are activated by a DC voltage.

7. The method of claim 1, wherein the built-in heating element is activated by a DC voltage.

8. A pressure sensor assembly, comprising:
   a first resistive bridge comprising a plurality of piezoresistive elements adapted to measure an applied pressure and to provide a voltage indicative of temperature within the first resistive bridge;
   a comparator configured to receive the voltage indicative of temperature; and
   a built-in heating element comprising one or of the plurality of piezoresistive elements of the first resistive bridge and in electrical communication with an electronic device, wherein the heating element is activated by the electronic device when the voltage falls below or rises above a threshold value.

9. The pressure sensor assembly of claim 8, wherein the built-in heating element comprises the first resistive bridge.

10. The pressure sensor assembly of claim 8, wherein the built-in heating element further comprises a second resistive network.

11. The pressure sensor assembly of claim 10, wherein the second resistive network is disposed adjacent to the first resistive bridge such that it is on a different yet substantially parallel plane.

12. A pressure sensor assembly having a built-in resistance heater element, comprising:
   a first resistive bridge comprising a first plurality of piezoresistive elements adapted to provide a first signal indicative of an applied pressure and a voltage indicative of temperature within the first resistive bridge; and
   a resistive network integrated with the first resistive bridge, comprising a second plurality of resistive elements adapted to provide heat to the first resistive bridge.

13. The assembly of claim 12, further comprising a span resistor coupled in series to the first resistive bridge, the span resistor being adapted for monitoring the voltage indicative of temperature across the first resistive bridge.

14. The assembly of claim 13, further comprising a comparator in electrical communication with the span resistor, adapted to activate the resistive network when the voltage falls below a threshold value.

15. The assembly of claim 12, wherein the resistive network is of a lower resistance than the first resistive bridge.

16. The assembly of claim 12, further comprising at least one bonding pad in electrical communication with the resistive network.

17. The assembly of claim 16, wherein the bonding pad is adapted to supply a separate DC voltage to the resistive network.

18. The assembly of claim 12, wherein the resistive network and the first resistive bridge are the same.

* * * * *